US011541602B2

(12) United States Patent
Sosnowski et al.

(10) Patent No.: US 11,541,602 B2
(45) Date of Patent: Jan. 3, 2023

(54) CONTROLLING MOISTURE CONTENT OF BUILD MATERIAL IN A THREE-DIMENSIONAL (3D) PRINTER

(71) Applicant: HEWLETT-PACKARD DEVELOPMENT COMPANY, L.P., Spring, TX (US)

(72) Inventors: Luke Sosnowski, Vancouver, WA (US); Justin M. Roman, Vancouver, WA (US); David Soriano, Vancouver, WA (US); Emiliano Gabriel Tolosa Gonzalez, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/607,788

(22) PCT Filed: Apr. 6, 2018

(86) PCT No.: PCT/US2018/026530
§ 371 (c)(1),
(2) Date: Oct. 24, 2019

(87) PCT Pub. No.: WO2019/194824
PCT Pub. Date: Oct. 10, 2019

(65) Prior Publication Data
US 2021/0016510 A1   Jan. 21, 2021

(51) Int. Cl.
*B29C 64/393*   (2017.01)
*B29C 64/124*   (2017.01)
(Continued)

(52) U.S. Cl.
CPC .......... *B29C 64/393* (2017.08); *B29C 64/124* (2017.08); *B29C 64/255* (2017.08);
(Continued)

(58) Field of Classification Search
CPC ........................... B29C 64/393; B29C 64/364
(Continued)

(56) References Cited

U.S. PATENT DOCUMENTS

2010/0189464 A1   7/2010   Matsuura
2012/0050760 A1   3/2012   Nishida
(Continued)

FOREIGN PATENT DOCUMENTS

| CN | 106827519 A | 6/2017 |
| CN | 206568564 U | 10/2017 |
| KR | 20170078396 A | 7/2017 |
| WO | WO2018006029 A1 | 1/2018 |

*Primary Examiner* — Matthew J Daniels
*Assistant Examiner* — Gregory C. Grosso
(74) *Attorney, Agent, or Firm* — Shook, Hardy & Bacon L.L.P.

(57) ABSTRACT

Techniques for controlling moisture content of build material in a three dimensional printer are provided. An example system includes a build material vessel to contain the build material and receive a flow of air, and a humidifier to adjust the humidity of the air flowing into the build material vessel. The system also includes one or more sensors to determine a dew point of the air flowing into the build material vessel. The humidity level of the air flowing into the hopper is controlled by the humidifier to maintain the dew point at a level that will prevent condensation of water inside the build material vessel.

9 Claims, 12 Drawing Sheets

(51) Int. Cl.
  *B29C 64/364*   (2017.01)
  *B29C 64/329*   (2017.01)
  *B29C 64/255*   (2017.01)
  *B33Y 40/00*    (2020.01)
  *B33Y 40/10*    (2020.01)
  *B33Y 10/00*    (2015.01)
  *B33Y 30/00*    (2015.01)

(52) U.S. Cl.
  CPC .......... *B29C 64/329* (2017.08); *B29C 64/364* (2017.08); *B33Y 40/00* (2014.12); *B33Y 40/10* (2020.01); *B33Y 10/00* (2014.12); *B33Y 30/00* (2014.12)

(58) Field of Classification Search
  USPC ........................................................ 264/40.1
  See application file for complete search history.

(56) References Cited

U.S. PATENT DOCUMENTS

| | | | |
|---|---|---|---|
| 2015/0132425 A1 | 5/2015 | Lacaze et al. | |
| 2015/0321255 A1* | 11/2015 | Colin | B33Y 10/00 |
| | | | 219/76.12 |
| 2017/0106595 A1 | 4/2017 | Gunther et al. | |
| 2019/0176404 A1* | 6/2019 | Schoeneborn | B22F 10/70 |
| 2020/0147883 A1* | 5/2020 | Kennedy | C23C 4/134 |
| 2020/0223140 A1* | 7/2020 | Reichel | B22F 12/00 |
| 2021/0138553 A1* | 5/2021 | Ferrar | B33Y 40/00 |

\* cited by examiner

700

CONTROLLING MOISTURE CONTENT OF BUILD MATERIAL IN A THREE-DIMENSIONAL (3D) PRINTER

BACKGROUND

Three-dimensional (3D) printing may produce a 3D object by adding successive layers of build material, such as powder, to a build platform, then selectively solidifying portions of each layer under computer control to produce the 3D object. The build material may be powder, or powder-like material, including metal, plastic, ceramic, composite material, and other powders. In some examples the powder may be formed from, or may include, short fibers that may, for example, have been cut into short lengths from long strands or threads of material. The objects formed can be various shapes and geometries, and may be produced using a model, such as a 3D model or other electronic data source. The fabrication may involve laser melting, laser sintering, heat sintering, electron beam melting, thermal fusion, and so on. The model and automated control may facilitate the layered manufacturing and additive fabrication. The 3D printed objects may be prototypes, intermediate parts and assemblies, as well as end-use products. Product applications may include aerospace parts, machine parts, medical devices, automobile parts, fashion products, and other applications.

DESCRIPTION OF THE DRAWINGS

Certain examples are described in the following detailed description and in reference to the following drawings.

DETAILED DESCRIPTION

Figure 1:
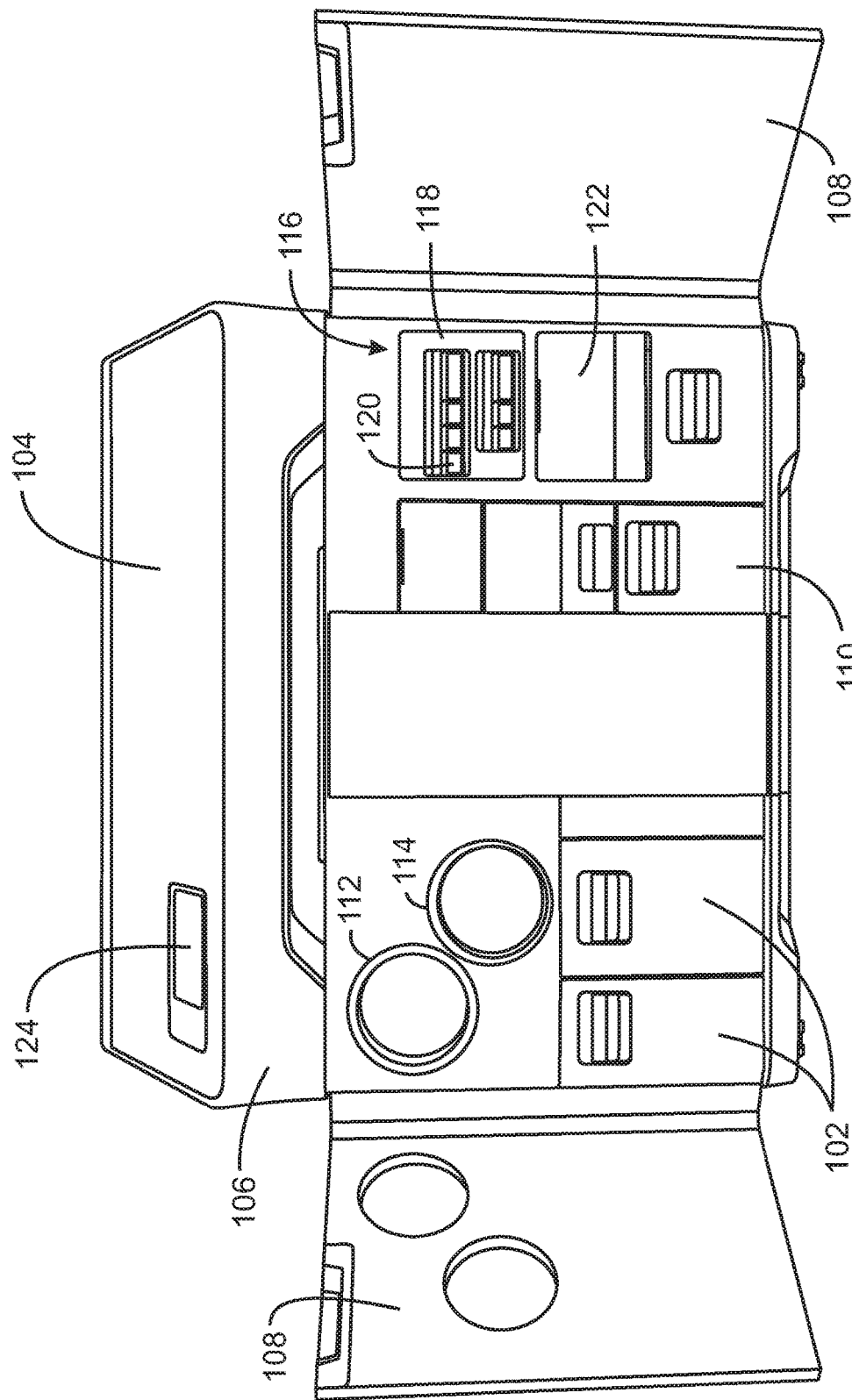
FIG. 1 is a drawing of a 3D printer, in accordance with examples.

Three dimensional printers may form 3D objects from different kinds of powder or powder-like build material. The build material can be, for example, a semi-crystalline thermoplastic material, a metal material, a plastic material, a composite material, a ceramic material, a glass material, a resin material, or a polymer material, among other types of build material. Further, the build material may include multi-layer structures wherein each particle comprises multiple layers. In some examples, a center of a build material particle may be a glass bead, having an outer layer comprising a plastic binder to agglomerate with other particles for forming the structure. Other materials, such as fibers, may be included to provide different properties, for example, strength.

An example 3D printer may include supply stations to facilitate handling of the build material. The supply stations provide for the addition of new or recycle build material to an internal or integrated material handling system from build material containers that are inserted into the supply stations. The material handling system may mix recycle material and new material to provide a build material mix to be used in a 3D printing process. Some 3D printers also provide for the recovery of excess or non-solidified build material at the end of a 3D printing process. The recovered material may be held in the printer for use in further build processes. In some cases, the recovered material may be moved into a build material container which may then be removed from the 3D printer for storage, recycling, or for later use.

It may be desirable at times to change the moisture content of the build material. For example, if the build material becomes too dry, the build material may be become electrically charged as comes into frictional contact with other materials, a phenomenon known as the triboelectric effect. If the build material becomes electrically charged, transport of the build material may not flow in a consistent manner, and charged powder may stick to other surfaces due to electrostatic attraction. Thus, it may be desirable at times to add moisture content to the build material to reduce the triboelectric effect and prevent charge accumulation. However, if there is too much moisture content in the build material, the build material may tend to clump together and inhibit the flow of the build material through the conveying system of the 3D printer.

This present disclosure describes techniques for controlling the humidity level of build material within a build material vessel such as a hopper. The build material vessel is configured to receive a flow of air from a humidifier to both fluidize the build material and control the moisture content of the build material. The humidity of the air is controlled to maintain the dew point of the air at a level that will prevent condensation of water inside the build material vessel and the conveying path for the air between the air conditioner and the build material vessel. More specifically, the dew point of the air flowing into the build material vessel is determined and the humidity is controlled to maintain the dew point at a level below the temperature inside the build material vessel. In some examples, the dew point is monitored by measuring the temperature of the air flowing into the build material vessel and inferring the humidity based on the temperature alone. To infer the humidity based on the temperature alone the humidifier is operated in such a way that it fully saturates the air. In another example, the dew point is monitored by measuring the temperature and relative humidity of the air flowing into the build material vessel, and full saturation is not needed. The disclosed techniques ensure that the build material has a uniform and controlled humidification level while preventing condensation of water in the build material. The moisture in the build material prevents triboelectric charging of the build material and also ensures that the build material will flow freely through build material conveying system of the three dimensional printer.

FIG. 1 is a 3D printer 100, in accordance with examples. The 3D printer 100 may be used to generate a 3D object from a build material, for example, on a build platform. The build material may be a powder, and may include a plastic, a metal, a glass, or a coated material, such as a plastic-coated glass powder, among others. It will be appreciated that the 3D printer 100 shown in FIG. 1 is one example of a 3D printer that can incorporate the techniques described herein for controlling the moisture content of the build material.

The printer 100 may have covers or panels over compartments 102 for internal material vessels that hold build material. The material vessels may discharge build material through feeders into an internal conveying system for the 3D printing. The printer 100 may have a controller to adjust operation of the feeders to maintain a desired composition of build material including a specified ratio of materials in the build material. The internal material vessels may be removable via user-access to the compartments 102. The printer 100 may have a housing and components internal to the housing for handling of build material. The printer 100 has a top surface 104, a lid 106, and doors or access panels 108. The access panels 108 may be locked during operation of the 3D printer 100. The printer 100 may include a compartment 110 for an additional internal material vessel such as a recovered material vessel that recovers unfused or excess build material from a build enclosure of the printer 100.

As described in detail herein, build material may be added or removed from the 3D printer through build material containers that are horizontally inserted into supply stations. The supply stations may include a new supply station 112 for the addition of new build material, and a recycle supply station 114 for the addition of recycled build material. As described in examples, the recycle supply station 114 may also be used to offload recovered build material, for example, from the recovered material vessel. In one example, a single supply station may be provided which may be used for both adding new build material and for removing recycled build material from the printer.

In some examples, the 3D printer 100 may use a print liquid for use in a selective fusing process, or other purposes, such as decoration. For examples of a 3D printer 100 that employ a print liquid, a print-liquid system 116 may be included to receive and supply print liquid for the 3D printing. The print-liquid system 116 includes a cartridge receiver assembly 118 to receive and secure removable print-liquid cartridges 120. The print liquid system 116 may include a reservoir assembly 122 having multiple vessels or reservoirs for holding print liquid collected from the print liquid cartridges 120 inserted into the cartridge receiver assembly 118. The print liquid may be provided from the vessels or reservoirs to the 3D printing process, for example, to a print assembly or printbar above a build enclosure and build platform.

The 3D printer 100 may also include a user control panel or interface 124 associated with a computing system or controller of the printer 100. The control interface 124 and computing system or controller may provide for control functions of the printer 100. The fabrication of the 3D object in the 3D printer 100 may be under computer control. A data model of the object to be fabricated and automated control may direct the layered manufacturing and additive fabrication. The data model may be, for example, a computer aided design (CAD) model, a similar model, or other electronic source. As described with respect to FIG. 12, the computer system, or controller, may have a hardware processor and memory. The hardware processor may be a microprocessor, CPU, ASIC, printer control card, or other circuitry. The memory may include volatile memory and non-volatile memory. The computer system or controller may include firmware or code, e.g., instructions, logic, etc., stored in the memory and executed by the processor to direct operation of the printer 100 and to facilitate various techniques discussed herein.

Figure 2:
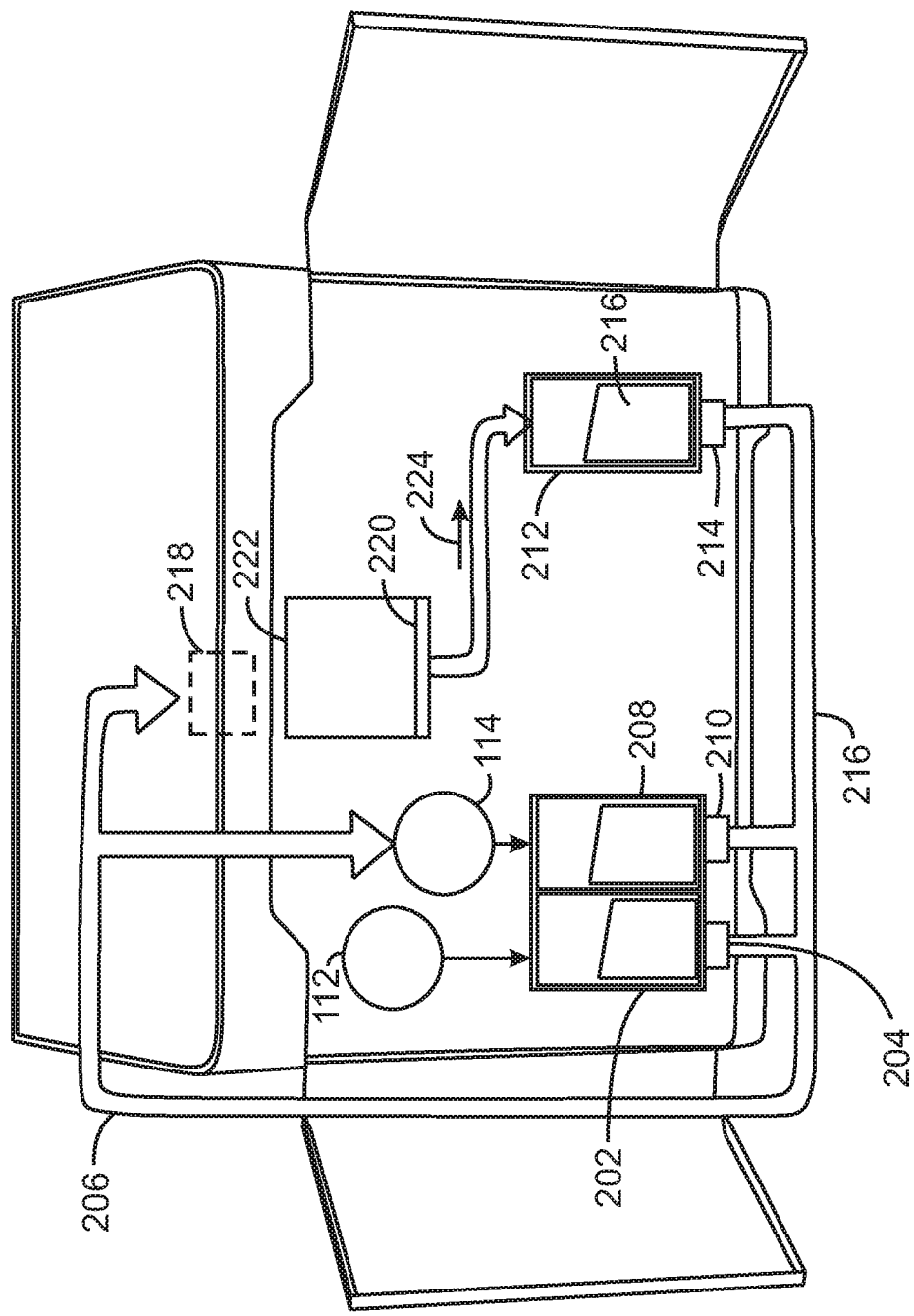
FIG. 2 is a schematic diagram of a 3D printer having a new material vessel that discharges new build material through a new feeder into a conveying system, in accordance with examples.

FIG. 2 is a schematic diagram of a 3D printer 200 having an internal new material vessel 202 that discharges new build material through a new feeder 204 into a conveying system 206, in accordance with examples. Like numbered items are as described with respect to FIG. 1. It will be appreciated that the 3D printer 200 shown in FIG. 2 is one example of a 3D printer that can incorporate the techniques described herein for controlling the moisture content of the build material.

The printer 200 may include a recycle material vessel 208 to discharge recycle build material through a recycle feeder 210 to the conveying system 206. The printer 200 may have a controller to adjust operation of the feeders 204, 210 to maintain a composition and discharge rate of the build material for the 3D printing. Further, the printer 200 may include a recovered material vessel 212 to discharge recovered material 216 through a recovery feeder 214 into the conveying system 206. The conveying system 206 may transport the build material to a dispense vessel 218 which may supply build material for 3D printing. In the illustrated example, the dispense vessel 218 is disposed in an upper portion of the 3D printer 200. Moreover, although the conveying system 206 for the build material is depicted outside of the 3D printer 200 for clarity in this schematic view, the conveying system 206 is internal to the housing of the printer 200. Additionally, the new material vessel 202, the recycle material vessel 208, and the recovered material vessel 212 may be removable via user-access to the compartments 102 and 110 as described above in relation to FIG. 1.

The 3D printer 200 may form a 3D object from the build material on a build platform 220 associated with a build enclosure 222. The 3D printing may include selective layer sintering (SLS), selective heat sintering (SHS), electron beam melting (EBM), thermal fusion, and fusing agent, or other 3D printing and additive manufacturing (AM) technologies to generate the 3D object from the build material. According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

Recovered build material 224, for example, non-solidified or excess build material, may be recovered from the build enclosure 222. The recovered build material 224 may be treated and returned to the recovered material vessel 212. Further, the printer 200 may include a new supply station 112 and a recycle supply station 114 to hold build material containers inserted by a user along a horizontal, or generally horizontal, axis. The supply stations 112 and 114 may provide new or recycled build material for the 3D printing to the new and recycle material vessels 202 and 208, respectively. Further, the conveying system 206 may return recovered material 216 to the recycle supply station 114. The recovered material 216 may be offloaded by being added to a build material container inserted in the recycle supply station 114, or may be diverted through the recycle supply station 114 to the recycle material vessel 208.

Lastly, as noted, the build material including the first material and the second material may be powder. A powder may be a granular material with a narrow size distribution, such as beads, or other shapes of small solids that may flow and be conveyed in an air stream. As used herein, the term "powder" as build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

Figure 3:
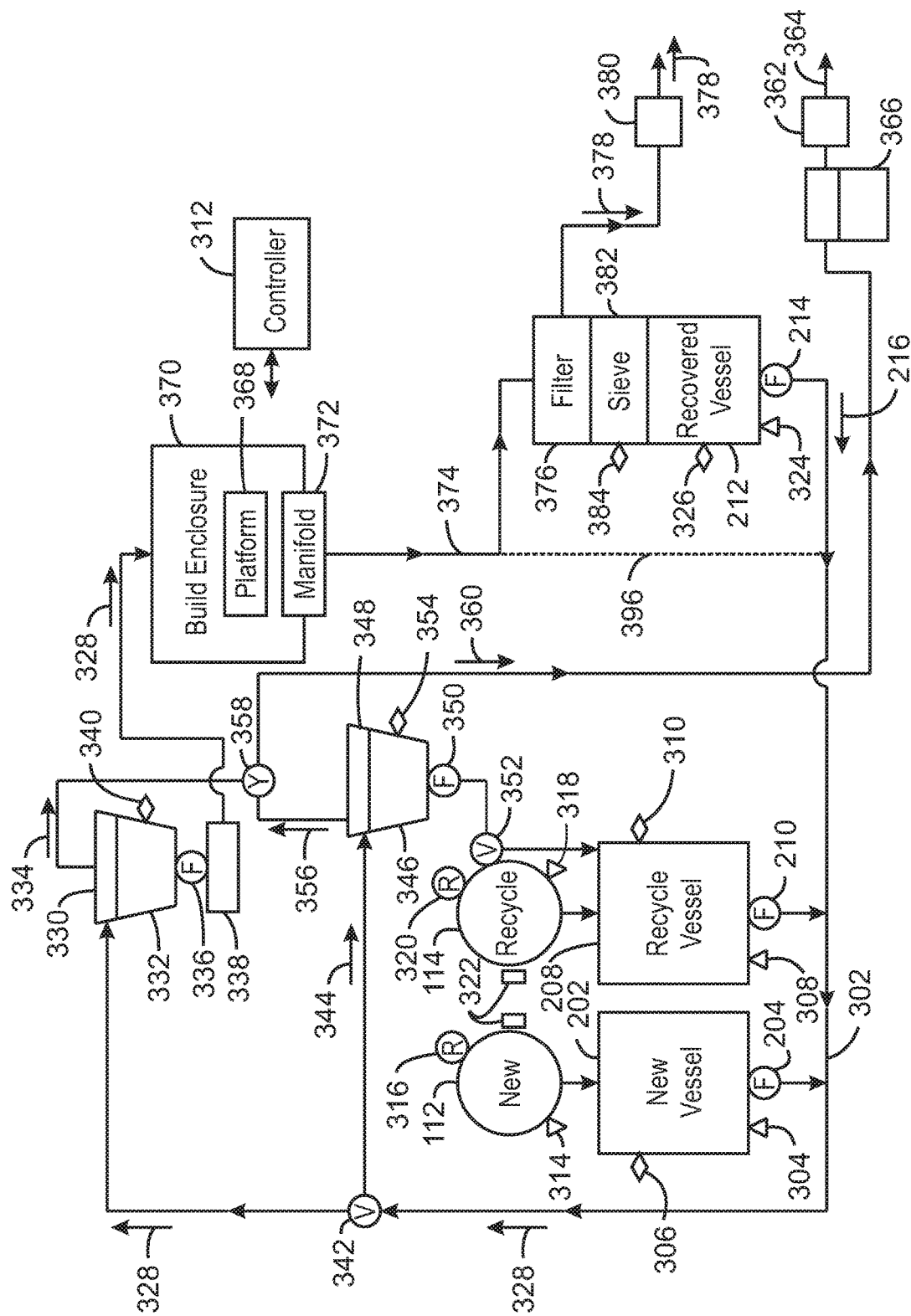
FIG. 3 is a block diagram of a 3D printer, in accordance with examples.

FIG. 3 is a block diagram of a 3D printer 300, in accordance with examples. Like numbered items are as described with respect to FIGS. 1 and 2. It will be appreciated that the 3D printer 300 shown in FIG. 3 is one example of a 3D printer that can incorporate the techniques described herein for controlling the moisture content of the build material.

As shown in this drawing, material flows are shown by labelled arrows placed along conveying lines or conduits, which may be separately labeled. In this example, the 3D printer 300 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 300 may include a recycle material vessel 208 that discharges recycle material through a feeder 210 into the first conveying system 302.

The new material vessel 202 may have a weight sensor 304 and a fill level sensor 306. Likewise, the recycle material vessel 208 may have a weight sensor 308 and a fill level sensor 310. A controller 312 of the printer 300 may adjust operation of the feeders 204 and 210 in response to indications of material discharge amount or rate provided by the weight sensors 304 and 308. The controller may adjust operation of the feeders 204 and 210 to maintain a desired ratio of new material to recycle material. In examples described herein, the controller 312 may control the dispensing of build material from a build material container, or the offloading of build material to a build material container.

The 3D printer 300 may include a new supply station 112 to hold a build material container for adding new build material in a cylindrical cage, along a horizontal axis. The new material vessel 302 may receive new build material from the build material container held by the new supply station 112. As described herein, the new supply station 112 may include several sensors and actuators to determine if a build material container is present, and control the dispensing of build material from the build material container. The sensors may include a weighing device 314 that may be used to determine the weight of the new supply station 112 and the build material container. The actuators may include a motor 316 to rotate the cylindrical cage in a first angular direction to dispense build material to the new material vessel 202.

The number of rotations of the cylindrical cage may be used to control the dispensing of an expected amount of build material from a build material container. Accordingly, the motor 316 may be a stepper motor, a servo motor, or other type of motor that may be used to control the number of revolutions and the speed of the rotation. In some examples, a motor having a controlled speed, such as a motor control using pulse width modulation or pulse frequency modulation, may be used with a sensor that counts the number of revolutions. For example, a base position sensor as described herein may be used to count the revolutions.

The 3D printer 300 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The sensors may include a weighing device 318 that may be used to determine the weight of the recycle supply station 114 and a build material container. The actuators may include a motor 320 to rotate the cylindrical cage in a first angular direction to dispense build material to the recycle material vessel 208. The recycle supply station 114 may also rotate the cylindrical cage in a second angular direction, opposite the first angular direction, to add recovered or recycled material to the build material container.

The new supply station 112 and the recycle supply station 114 may also include several other sensors and actuators 322 to provide functionality, as described in greater detail herein. The other sensors and actuators 322 may include a latching sensor to determine if a build material container is secured in a supply station, and a position sensor to determine if a build material container is in a base position, among others. As used herein, a base position is an initial position of the build material container after insertion into a supply station 112 or 114. In the base position, sensors and actuators 322 on a support structure may interact with the cylindrical cage. Further, the sensors and actuators 322 may include actuators to actuate a valve on the build material container, for example, opening or closing the valve, or advance the read head to an information chip on a build material container, among others.

As described herein, the printer 300 may include a recovered material vessel 212 which discharges recovered material 216 through a recovery feeder 214 into the first conveying system 302. The recovered material vessel 212 may have a weight sensor 324 and a fill level sensor 326. Accordingly, the build material 328 may include recovered material 216 from the recovered material vessel 212 in addition to the recycle material from the recycle material vessel 208 and new material from the new material vessel 202.

Conveying air may flow into the first conveying system 302 through the new vessel 202, the recycle vessel 208, and the recovered vessel 326. The air may also be used for the second conveying system discussed below. Air flowing into the new vessel 202, the recycle vessel 208, and the recovered vessel 326 is provided by an air intake system, which includes a humidifier (not shown). For the sake of clarity, components of the air intake system are shown separately in FIGS. 4 and 6. The first conveying system 302 may transport the build material 328, e.g., a mix of new material, and recycle material from the vessels 202 and 208, respectively. In some instances, the build material 328 may also include recovered material 216. In the illustrated example, the first conveying system 302 may convey the build material 328 to a separator 330 associated with a dispense vessel 332. The dispense vessel 332 may be a feed hopper. The separator 330 may include a cyclone, a screen, a filter, and the like. The separator 330 may separate conveying air 334 from the build material 328.

After the conveying air 334 has been separated, the build material 328 may flow into the dispense vessel 332. A feeder 336 may receive build material from the dispense vessel 332 and discharge the build material to a build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator 348 such as cyclone, filter, etc. The alternate vessel 346 may discharge the diverted material 344 through a feeder 350 and diverter valve 352 to either a build material container in the supply station 114, or to the recycle material vessel 208. As described in examples herein, the diverter valve 352 may be part of a valve mechanism used to dispense recycled build material from a build material container.

This diversion of build material 328 by diverter valve 342 as recycle material 344 may occur, for instance, when the build material 328 is primarily recycle material or recovered material 216. This may be performed to offload material, for example, by diverting the material through diverter valve 352 to a build material container. In other examples, the recycle material 344 may be sent by the diverter valve 352 to the recycle material vessel 208. As with other material vessels, the alternate vessel 346 may have a fill level sensor 354.

The separator 348 associated with the alternate vessel 346 may remove conveying air 356 from the build material 328. After the conveying air 356 is removed from the build material 328, the build material 328 may discharge from the separator 348 into the alternate vessel 346. In the illustrated example, the conveying air 356 from the separator 348 may flow to a Y-fitting 358, where the conveying air 356 is combined with the conveying air 334 from the separator 330 associated with the dispense vessel 332. The Y-fitting 358 may be a conduit fitting having two inlets and one outlet. The combined conveying air 360 may be pulled from the Y-fitting 358 by a motive component 362 of the first conveying system 302 and discharged 364 to the environment or to additional equipment for further processing. In some examples, the combined conveying air 360 may flow through a filter 366 as it is being pulled out by the motive component 362. The filter 366 may remove particulates from the conveying air 360 before it is discharged 364.

The motive component 362 applies motive force for the conveying air in the first conveying system 302 to transport build material. The motive component 362 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 300 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be offloaded with the 3D object or removed by a stand-alone vacuum.

If the second conveying system 374 is used, it may convey the recovered material through a cyclone or filter 376 to separate the recovered material from the conveying air 378. The conveying air 378 is discharged through a motive component 380 of the second conveying system 374. A filter may be included to remove particulates from the conveying air 378. The motive component 380 may be a blower, fan, eductor, ejector, vacuum pump, or other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212. In some examples, the recovered material may bypass the cyclone or filter 376, sieve 382, and recovered material vessel 212 and flow into a conduit of the first conveying system 302, as indicated by the dashed line 396. The vessels, conveying systems, and associated equipment of the 3D printer 300 may include instrumentation such as pressure sensors and temperature sensors, and the like.

The 3D printer 300 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 300 are mechanical parts which may be metal or plastic, and which may be equivalent or similar to mechanical parts produced by other fabrication techniques, for example, injection molding or blow molding, among others.

Examples provided herein describe supply stations for moving build material into and out of a 3D printer. The material may be provided in build material containers, which may be purchased with new build material and used for recycle build material once empty. For further flexibility, build material containers may be purchased when empty to store build material offloaded from the 3D printer. This may be convenient when changing the type of build material used in the 3D printer.

To perform these functions, a build material container may be horizontally, or substantially horizontally, secured in a cylindrical cage supported in a stationary support structure in the supply station. The supply station may open a valve in a center of an end of the build material container by sliding the valve outward along a horizontal axis. The supply station may then move material in or out of the build material container by rotating, in an appropriate direction, the cylindrical cage around the horizontal axis. Rotating the cylindrical cage in a first angular direction may be used to dispense build material from a build material container, while rotating the cylindrical cage in a second, or opposite, angular direction may be used to add build material back into the build material container.

As mentioned above, the 3D printer also includes an air intake system coupled to the new vessel 202, the recycle vessel 208, and the recovered vessel 326. Some examples of air intake systems are described further below in relation to FIGS. 4, 6, and 8.

Figure 4:
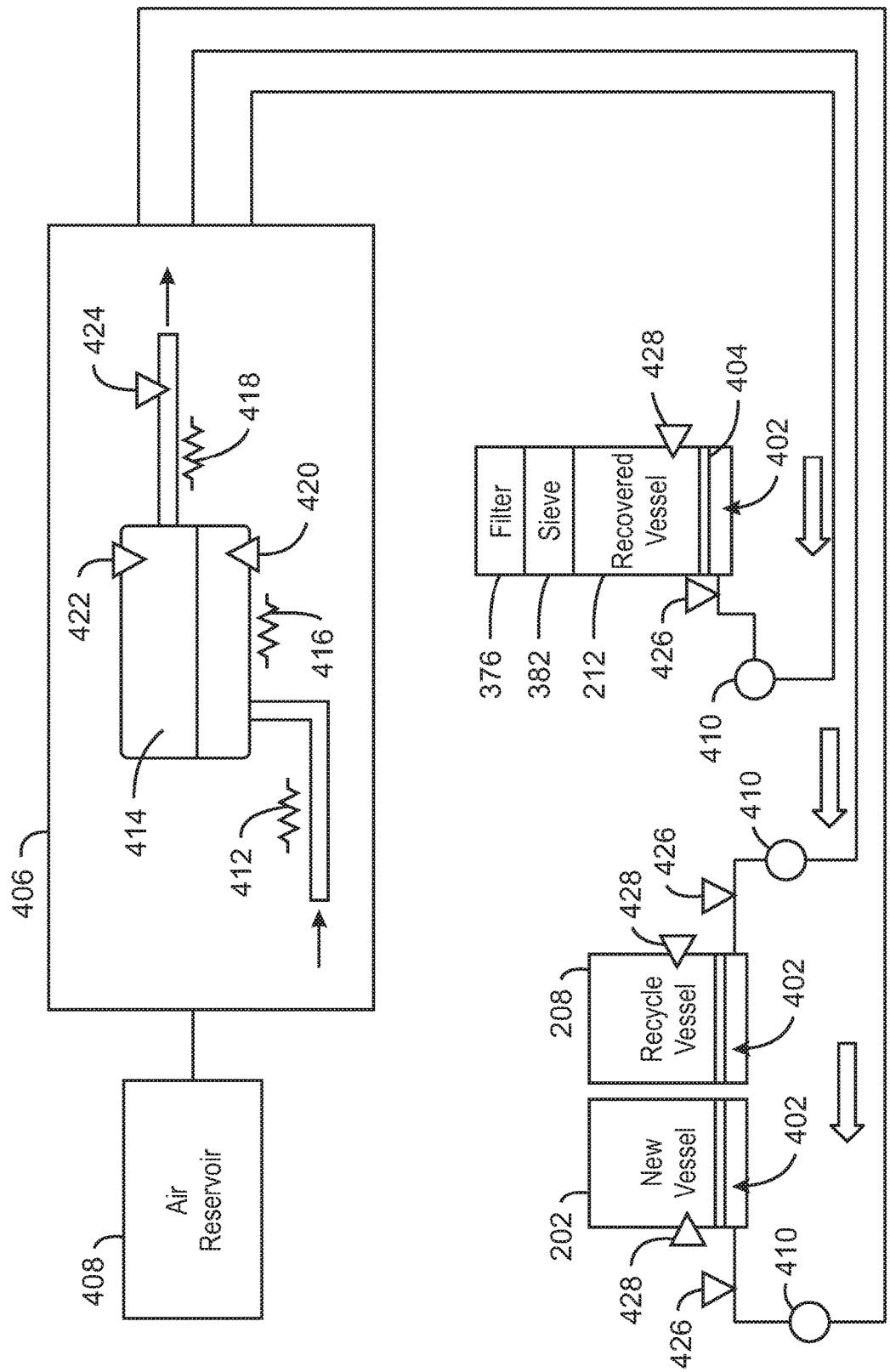
FIG. 4 is an example of an air intake system for a 3D printer.

FIG. 4 is an example of an air intake system for a 3D printer. The air intake system 400 is configured to provide air to various components of a 3D printer with a controlled humidity level. The example air intake system 400 shown in FIG. 4, provides humidified air to the new vessel 202, the recycle vessel 208, and the recovered vessel 326. It will be appreciated that the intake air system 400 can provide air to more or fewer vessels, depending on the design considerations of a particular implementation.

The air provided by the air intake system 400 is delivered to an air flow chamber 402 disposed below the build material bed 404, which includes a porous membrane. The build material bed 404 includes a porous membrane that allows air and moisture to flow up from the air flow chamber 402 through the build material contained within the vessel. The porous membrane is configured to provide a uniform flow of air across the surface area of the porous membrane while preventing build material from falling into the air chamber 402. The porous membrane may be formed from any suitable material including polyethylene, metal, plastic, combinations thereof, and the like. In some examples, the porous membrane is formed from an Ultra High Molecular Weight Polyethylene (UHMWPE). Controlling the humidity of the air flowing into the build material vessel prevents condensation of water inside the porous membrane, which is at roughly the same temperature as the build material.

The air flow through the porous membrane will be at a velocity sufficient to fluidize the build material. Fluidization refers to a stimulation of the build material that causes it to exhibit the flow properties of a fluid. The fluidization caused by the air flow stimulates the flow of build material from the build material vessel and into the conveying system 302 (FIG. 3). In addition to fluidizing the build material, the air flowing through the porous membrane of the build material bed also controls the level of moisture content in the build material. The humidity of the air flowing into the build material vessel may be controlled to maintain a desired level of moisture content in the build material. The desired level of moisture content may be determined based on a number of factors, including the type of build material, the temperature of build material, and others.

The air intake system 400 includes humidifier 406 to control the humidity of the air flowing into the build material vessels 202, 208, and 212. The humidifier 406 receives air from an air reservoir 408, which may be configured to draw in ambient air through a filter. The humidifier 406 then humidifies the air and outputs the air to the new vessel 202, the recycle vessel 208, and the recovered vessel 326. The air flow through the air intake system may be created, at least in part, by one or more air pressure generators 410 coupled to the build material vessels 202, 208, and 212. In some examples, the air flow is created by a component of the humidifier 402 itself or additional motive components, such as motive components 362 and 380 shown in FIG. 3. Each motive component 410 may be a blower, fan, eductor, ejector, vacuum pump, or other type of motive component.

The air intake system 400 shown in FIG. 4, uses a set of temperature sensors to control the humidity of the air flowing into the build vessels. In this example, the design and control of the humidifier enables the humidity to be controlled without the use of relative humidity sensors. An example air intake system with relative humidity sensing in described in relation to FIGS. 6-9.

In the example air intake system 400 of FIG. 4, the humidifier 406 includes a pre-heater 412, a heated water bath 414 with heater 416, and a post-heater 418. The air flowing into the water bath 414 is percolated up through the water to achieve saturation of the water vapor in the air. The saturation humidity can be determined based solely by sensing the temperature of the air flowing out of the humidifier 406. The system 400 takes advantage of the self-limiting nature of the saturation process to place the dew point in a known location on a psychrometric chart determined by temperature. This can be advantageous because humidity sensors can be less reliable than simple temperature sensors. The humidifier 406 includes a number of temperature sensors, including a first temperature sensor 420 to measure the temperature of the water in the water bath 414, a second temperature sensor 422 to measure the temperature of the air flowing out of the water bath 414, and a third temperature sensor 424 to measure the temperature of the air flowing out of the humidifier 406 after being heated by the post-heater 418. The components 412-424 of the humidifier 406 may be replicated for each coupled build material vessel 202, 208, and 212 to enable individual control of the build material in each vessel.

Each build material vessel 202, 208, and 212 includes a first temperature sensor 426 to measure the temperature of the air flowing into the respective build material vessel. The relative humidity of the air flowing into each build material vessel can be determined based on the measured temperature of the air. Each build material vessel 202, 208, and 212 also includes a second temperature sensor 428 inside the build material vessel. The second temperature sensor 428 is placed at a location inside the vessel such that it will be surrounded by the fluidized build material, allowing it to effectively measure the temperature of the build material.

The humidifier 406 is controlled so that the dew point of the air entering the vessel is lower than the temperature of the build material by a predetermined safety margin. For example, the safety margin may be approximately 3 degrees. The moisture content of the powder is inferred based on the relative humidity of the air flowing into the build material vessel. This is possible because there is a known relationship between the moisture content in the build material and the relative humidity of the air flowing through the build material after a suitable amount of time has passed to ensure that the moisture content has reached an equilibrium. Accordingly, the humidified air may be circuited through the build material for a predetermined length of time that will allow the build material to achieve the expected level of moisture content before the build material is fed to the conveying system. The length of time allowed to achieve equilibrium can be determined through experimentation and will be effected by various system properties, such as the air flow rate, the mass and type of the build material. A method of controlling the humidifier to provide the desired humidity is described further in relation to FIG. 5.

Figure 5:
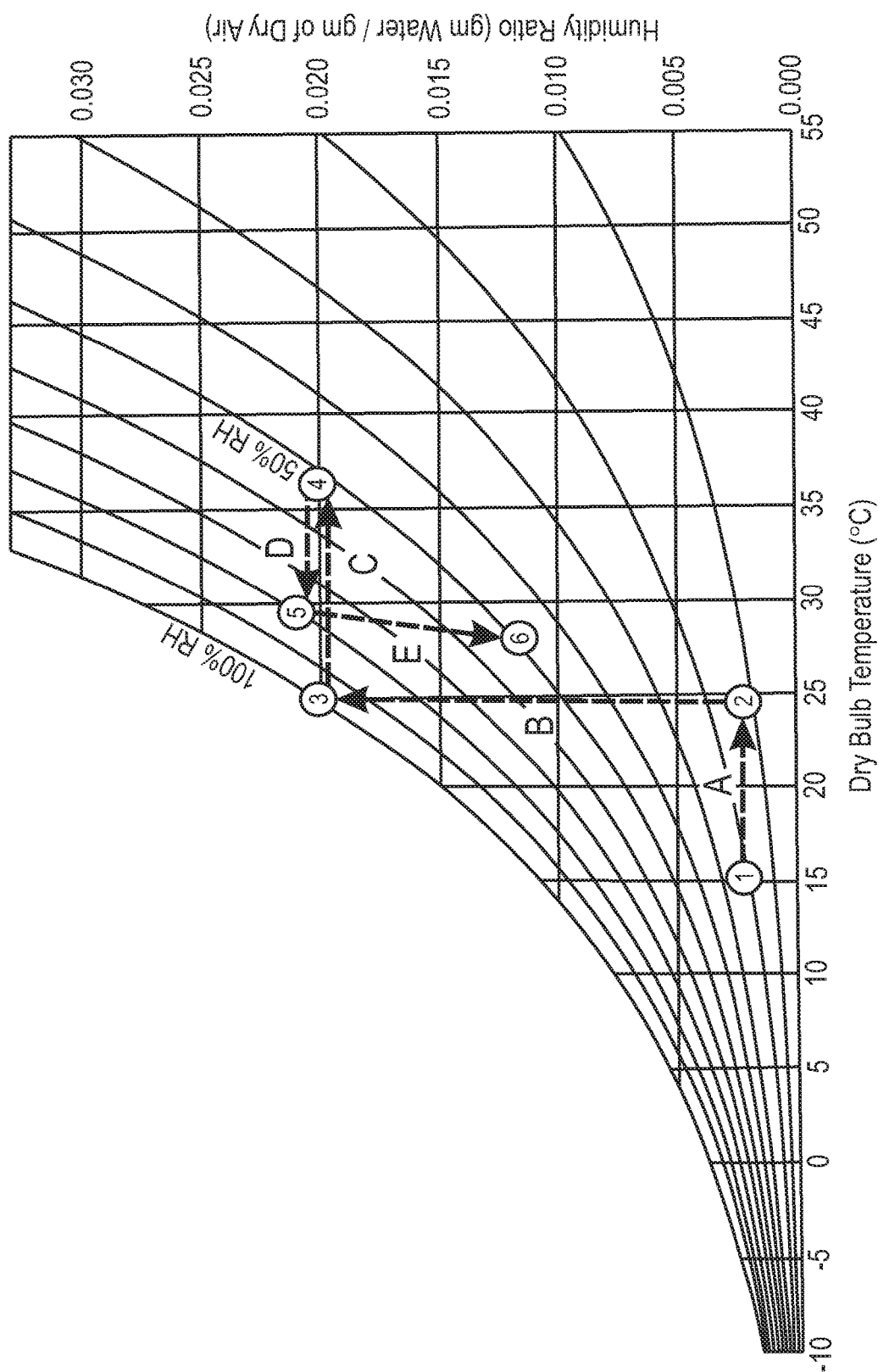
FIG. 5 is a psychrometric chart describing an example technique for controlling the humidity of the air flowing through the air intake system shown in FIG. 4.

FIG. 5 is a psychrometric chart describing an example technique for controlling the humidity of the air flowing through the air intake system 400 shown in FIG. 4. In this description, reference will also be made to components of the humidifier shown in FIG. 4. In FIG. 5, point 1 represents the ambient air drawn in from the air reservoir 408, and path A represents preheating of the air under the control of the heater 412. Point 2 represents the air after preheating. This air preheating stage heats the air to a specified temperature that corresponds with the desired humidity level.

Path B represents the saturation of the air as it passes through the water bath 414. In this stage, moisture is added to the air up to the saturation level, i.e., the dew point of the air. This is a self-limiting process with heated water providing the vaporization energy. A small amount of air heating may also occur. As shown in FIG. 5, the resulting dew point is determined by the air temperature achieved during the air preheating stage represented by path A. Thus, the temperature of the air exiting the pre-heater 412 will directly determine the dew point of the air exiting the humidifier 406. The preheating stage can be controlled to set the dew point of the air a few degrees lower than the temperature of the build material as measured by the temperature sensor 428.

Path C represents the air post-heating stage, in which the air exiting the water bath 414 is heated by the heater 418, and point 4 represents the air as it exits the humidifier 406. The air post-heating stage provides a thermal margin to prevent condensation without changing the dew point of the air. In some examples, the air post-heating stage can also provide additional heat for heating the build material.

Path D represents the air heat loss experienced during transportation of the air to the build material vessel 202, 208, or 212. In some examples, the heat loss may be reduced with insulated tubing. The elevated air temperature provided by the post-heater 418 lowers the relative humidity of the air in the tubing to avoid condensation. Point 5 represents the temperature of the air as it enters the build material vessel, which can be measured using the sensor 426.

Path E represents the transfer of moisture and heat to the build material within the build material vessel. The air reaches equilibrium within the build material in both humidity and temperature before it exits out of the build material. The enthalpy change of the air indicated by path E equals the energy change of the build material.

Figure 6:
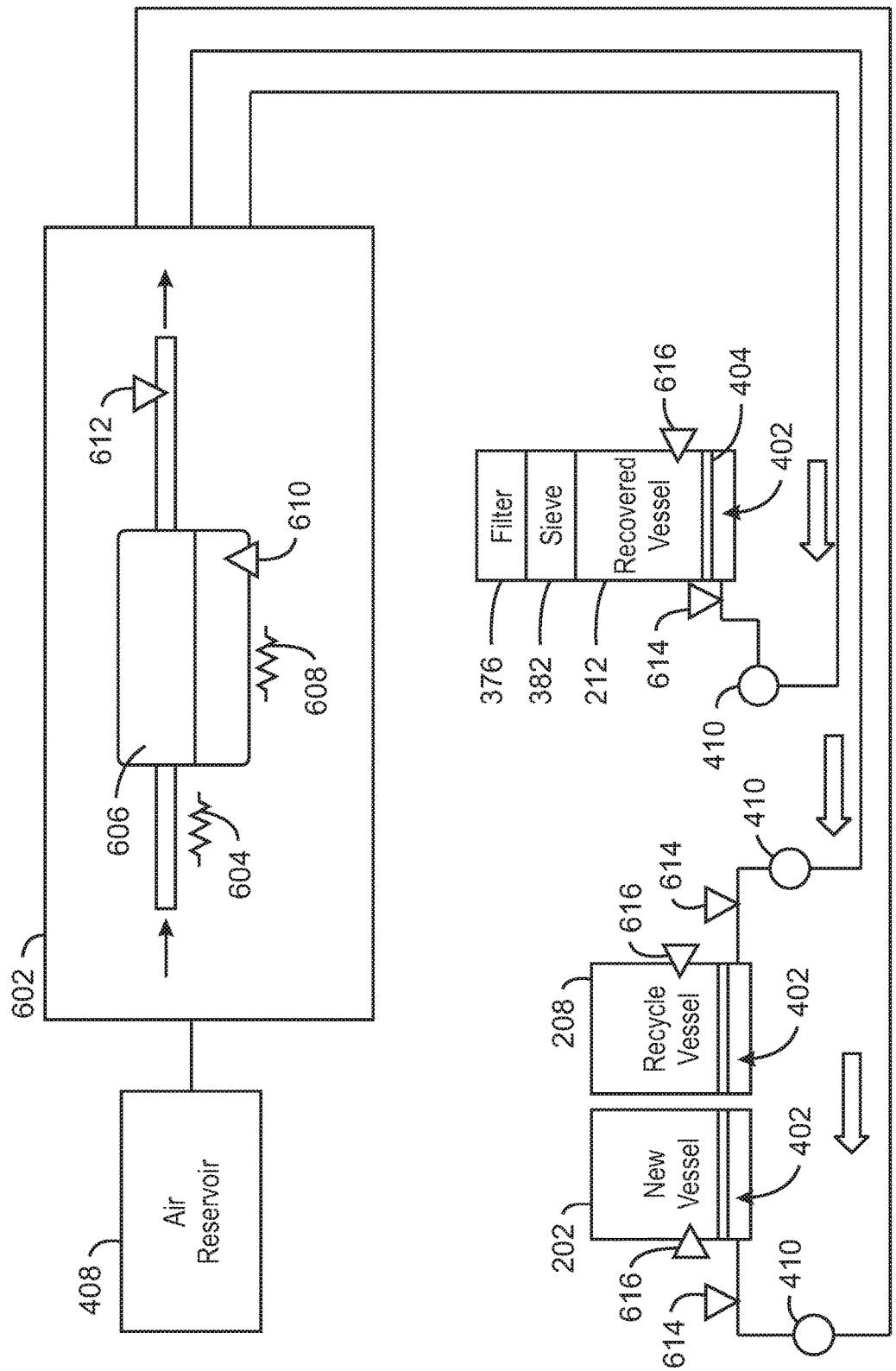
FIG. 6 is another example of an air intake system for a 3D printer.

FIG. 6 is another example of an air intake system for a 3D printer. The air intake system 600 is configured to provide humidified air to various components of a 3D printer such as the new vessel 202, the recycle vessel 208, and the recovered vessel 326. It will be appreciated that the intake air system 600 can provide air to more or fewer vessels, depending on the design considerations of a particular implementation. Like numbered items are as described with respect to FIG. 4.

The air intake system 600 of FIG. 6 is similar to the system described above in relation to FIG. 4, but uses relative humidity sensors and temperature sensors to control the relative humidity of the air flowing into the build vessel. In the example air intake system 600 of FIG. 6, the humidifier 602 includes a pre-heater 604 and a heated water bath 606 heated by heater 608. The air flowing into the water bath 606 passes over the heated water before exiting the humidifier 602. In this way, the air flowing through the humidifier picks up water from the water bath 606 without achieving saturation.

The humidifier 602 includes a temperature sensor 610 to measure the temperature of the water in the water bath 606. The humidifier 602 may also include a temperature and relative humidity sensor 612 to measure the temperature and relative humidity of the water flowing out of the humidifier 602. The components 604-612 of the humidifier 602 may be replicated for each coupled build material vessel 202, 208, and 212 to enable individual control of the build material in each vessel.

Each build material vessel 202, 208, and 212 includes a first temperature and relative humidity sensor 614 to measure the temperature and relative humidity of the air flowing into the respective build material vessel. The dew point of the air flowing into each build material vessel can be determined based on the measured temperature of the air and the measured relative humidity. Each build material vessel 202, 208, and 212 also includes a second temperature and relative humidity sensor 616 inside the build material vessel. The second temperature and relative humidity sensor 616 is placed at a location inside the vessel such that it will be surrounded by the fluidized build material, allowing it to effectively measure the temperature and relative humidity of the build material.

The humidifier 602 is controlled so that the dew point of the air entering the vessel is lower than the temperature of the build material by a predetermined safety margin, e.g., approximately 3 degrees. The moisture content of the build material is inferred based on the relative humidity the build material as measured by the temperature and relative humidity sensor 616. As mentioned above, there is a known correlation between the moisture content in the build material and the relative humidity of the build material after a suitable amount of time has passed to ensure that the moisture content has reached an equilibrium. To ensure the moisture content has achieved equilibrium, the relative humidity of the build material can be monitored throughout the humidification process. Once the desired equilibrium moisture content level is reached, the build material vessel can begin feeding build material into the conveying system. A method of controlling the humidifier 602 to provide the desired humidity is described further in relation to FIG. 7.

Figure 7:
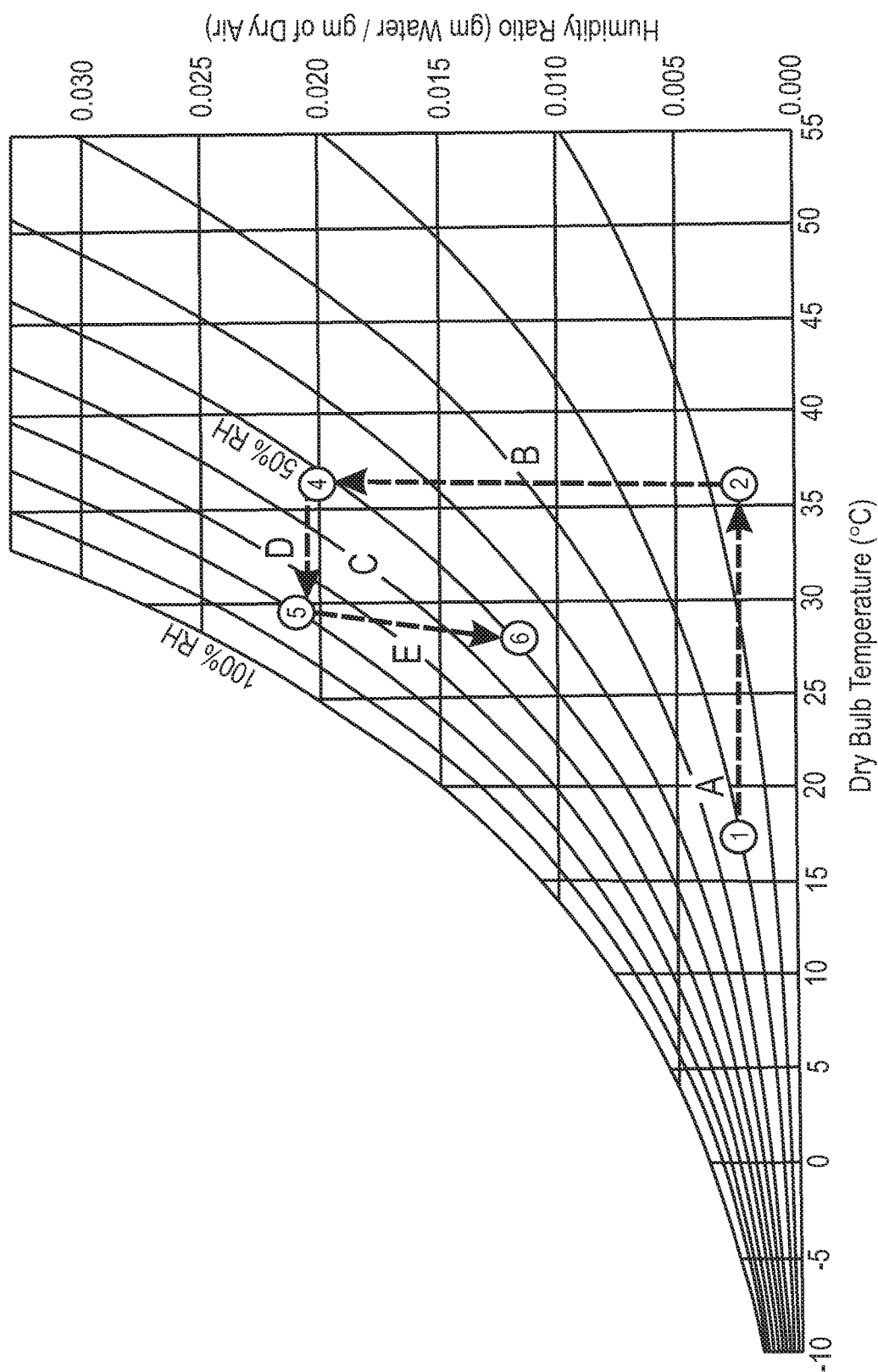
FIG. 7 is a psychrometric chart describing an example technique for controlling the humidity of the air flowing through the air intake system shown in FIG. 6.

FIG. 7 is a psychrometric chart describing an example technique for controlling the humidity of the air flowing through the air intake system 600 shown in FIG. 6. In this description, reference will also be made to components of the humidifier shown in FIG. 6. In FIG. 7, point 1 represents the ambient air drawn in from the air reservoir 408, and path A represents preheating of the air under the control of the heater 604. Point 2 represents the air after preheating. This air preheating stage heats the air to a specified final temperature, which may be controlled to add a thermal margin to prevent condensation and optionally to heat the build material.

Path B represents the partial saturation of the air as it passes over the water bath 606. In this stage, moisture is added to the air to bring it to a humidity ratio, as represented by point 4, which corresponds with the desired relative humidity. A small amount of air heating may also occur. Unlike the air intake system 400 shown in FIG. 4, the air does not become fully saturated and the process is therefore not self-limiting.

Path D represents the air heat loss experienced during transportation of the air to the build material vessel 202, 208, or 212. In some examples, the heat loss may be reduced with insulated tubing. Point 5 represents the temperature and relative humidity of the air as it enters the build material vessel, which can be measured using the sensor 614.

Path E represents the transfer of moisture and heat to the build material within the build material vessel. The air reaches equilibrium within the build material in both humidity and temperature before it exits out of the build material. The enthalpy change of the air indicated by path E equals the energy change of the build material.

For the air intake system 600, the desired output temperature is reached by pre-heating the air going into the system. Air temperature is controlled by direct negative feedback from the temperature sensor 614 to the power of the input air heater 604. The desired relative humidity is reached by controlling the water temperature of the water bath 606 with negative feedback from the output of the relative humidity sensor 614. Controlling the humidifier 602 in this way will also enable the water heater 608 to compensate for changes in air flow rate.

Figure 8:
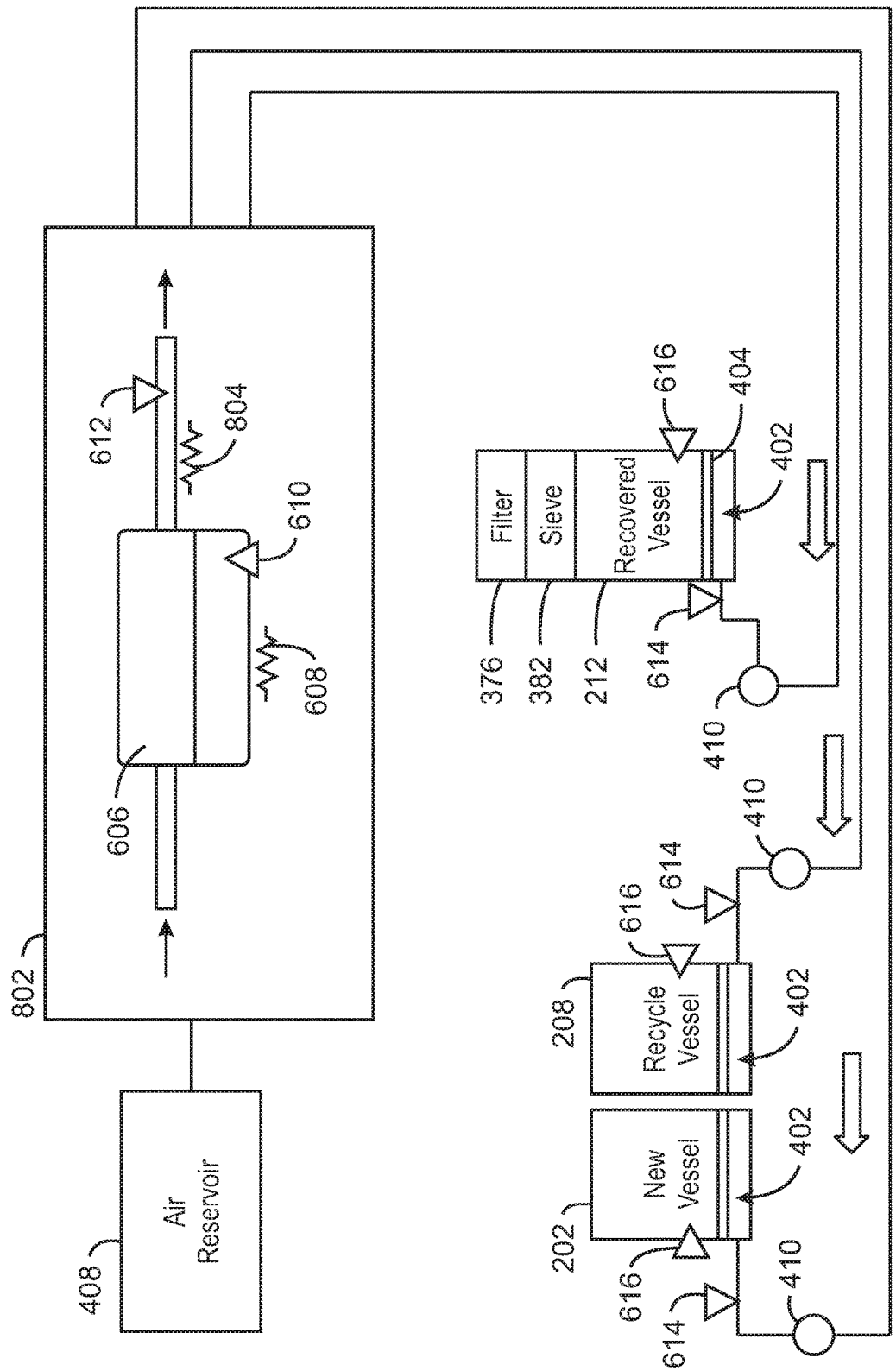
FIG. 8 is another example of an air intake system for a 3D printer.

FIG. 8 is another example of an air intake system for a 3D printer. The air intake system 800 is configured to provide humidified air to various components of a 3D printer such as the new vessel 202, the recycle vessel 208, and the recovered vessel 326. It will be appreciated that the intake air system 800 can provide air to more or fewer vessels, depending on the design considerations of a particular implementation. Like numbered items are as described with respect to FIGS. 4 and 6.

The air intake system 800 of FIG. 8 is similar to the system described above in relation to FIG. 6, and uses relative humidity sensors and temperature sensors to control the relative humidity of the air flowing into the build vessel. In the example air intake system 800 of FIG. 8, the humidifier does not include an air pre-heat stage, but rather includes a post heater 804 that heats the air after it leaves water bath 606.

As described above in relation to FIG. 6, the humidifier 802 is controlled so that the dew point of the air entering the build material vessel is lower than the temperature of the build material by a predetermined safety margin, and the moisture content of the build material is inferred based on the relative humidity of the build material as measured by the temperature and relative humidity sensor 616. Methods of controlling the humidifier 802 to provide the desired humidity are described further in relation to FIG. 9.

Figure 9:
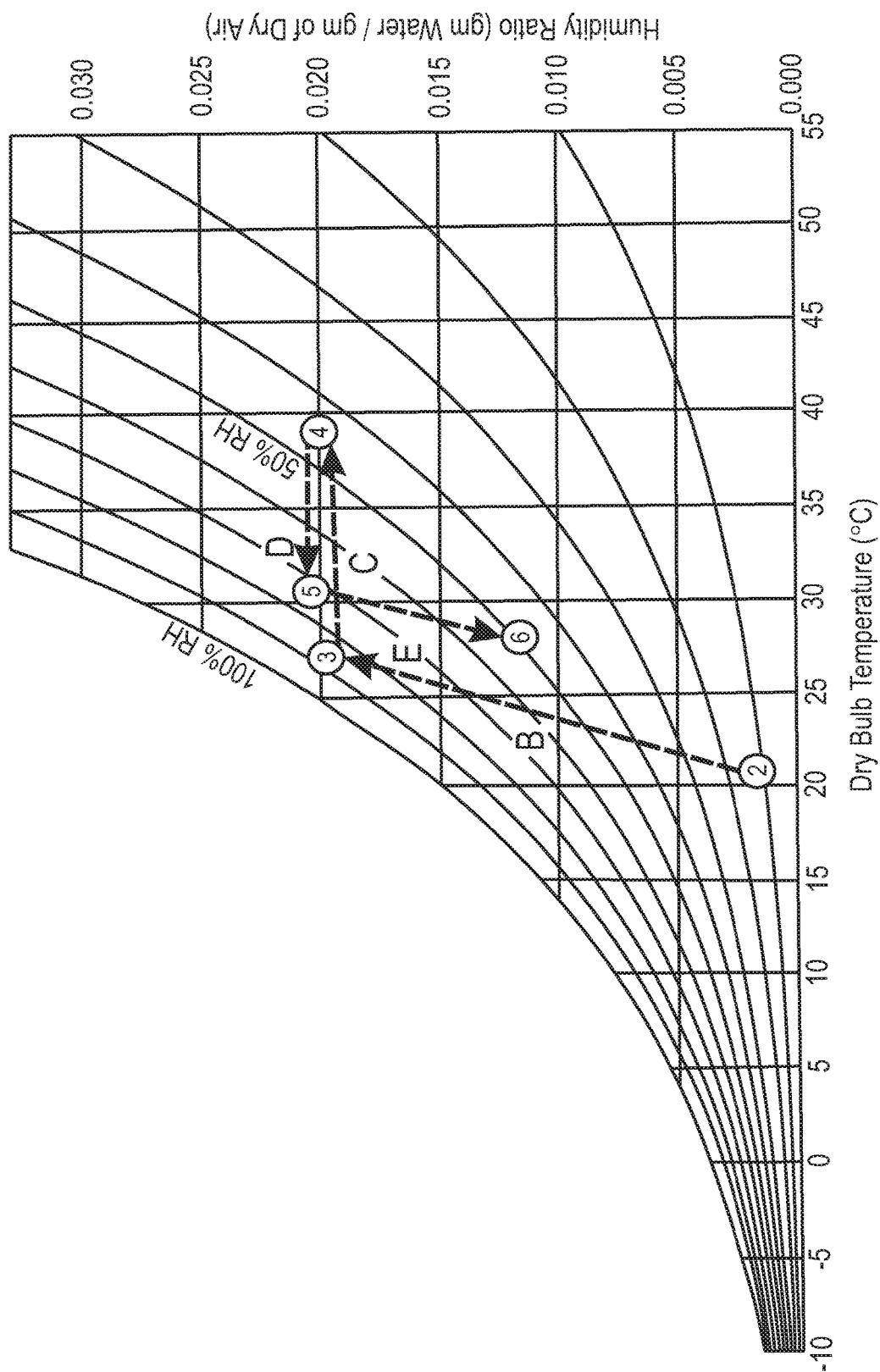
FIG. 9 is a psychrometric chart describing a technique for controlling the humidity of the air flowing through the air intake system shown in FIG. 8.

FIG. 9 is a psychrometric chart describing a technique for controlling the humidity of the air flowing through the air intake system 800 shown in FIG. 8. In this description, reference will also be made to components of the humidifier shown in FIG. 8. In FIG. 9, point 1 represents the ambient air drawn in from the air reservoir 408.

Path B represents the partial saturation of the air as it passes over the water bath 606. In this stage, moisture is added to the air to bring it to a humidity ratio, as represented by point 3, which corresponds with the desired relative humidity. Some heating of the air will also occur due to contact with the water bath 606. As in the air intake system 600, the air does not become fully saturated and is therefore the process is not self-limiting.

Path C represents post-heating of the air under the control of the heater 804. Point 2 represents the air after preheating. This air post-heating stage heats the air to a specified final temperature, which may be controlled to add a thermal margin to prevent condensation and optionally to heat the build material.

Path D represents the air heat loss experienced during transportation of the air to the build material vessel 202, 208, or 212. In some examples, the heat loss may be reduced with insulated tubing. Point 5 represents the temperature and relative humidity of the air as it enters the build material vessel, which can be measured using the sensor 614.

Path E represents the transfer of moisture and heat to the build material within the build material vessel. The air reaches equilibrium within the build material in both humidity and temperature before it exits out of the build material. The enthalpy change of the air indicated by path E equals the energy change of the build material.

For the air intake system 800, the desired output temperature is reached by post-heating the air going into the system. Air temperature is controlled by direct negative feedback from the temperature sensor 614 to the power of the output air heater 804. The desired relative humidity is reached by controlling the water temperature of the water bath 606 with negative feedback from the output of the relative humidity sensor 614. Controlling the humidifier 602 in this way will also enable the water heater 608 to compensate for changes in air flow rate.

Figure 10:
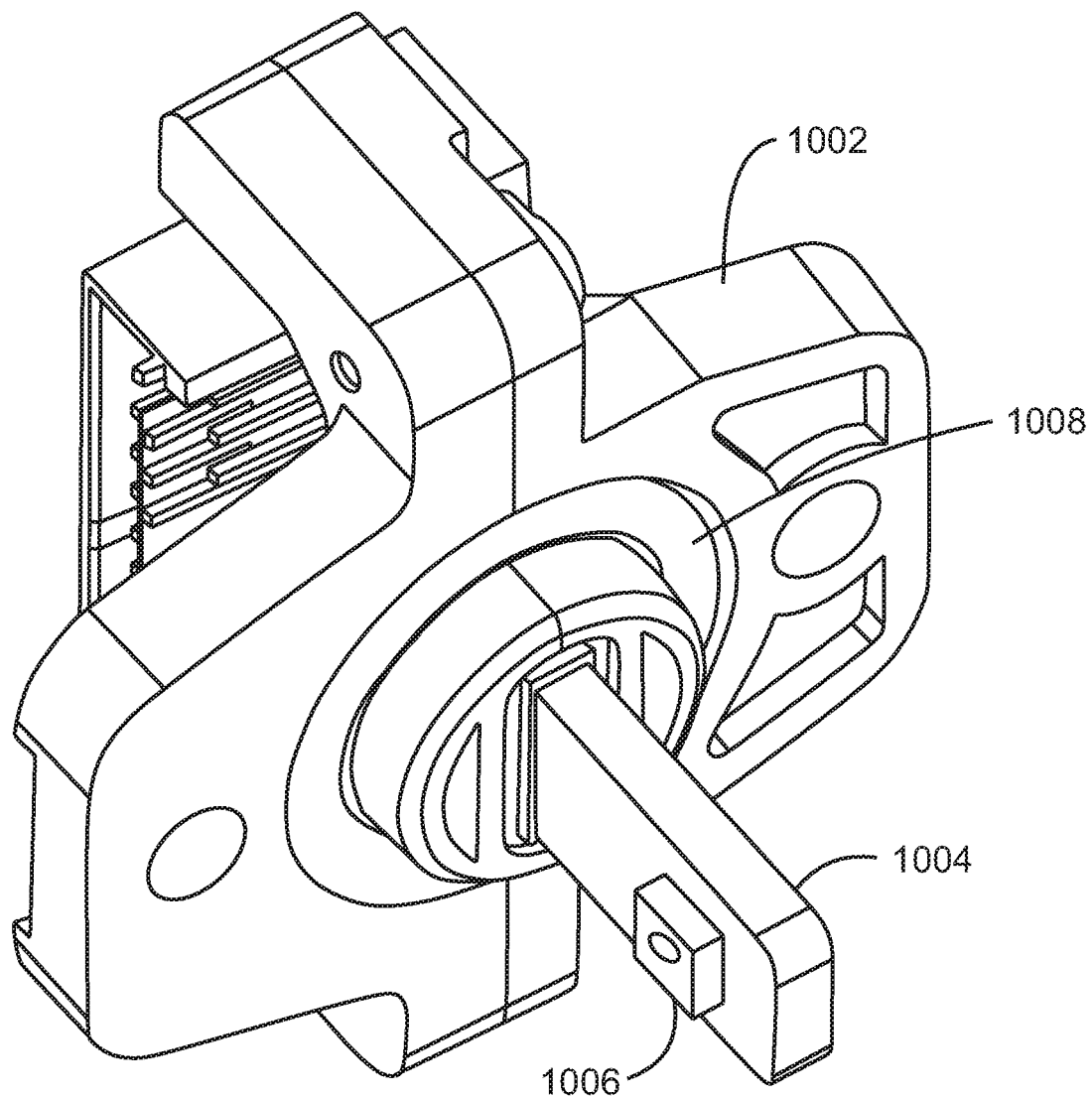
FIG. 10 is a sensor module, in accordance with examples.

FIG. 10 is a sensor module 1000 in accordance with examples. The sensor module 1000 can be used in a build material vessel, such as the build material vessels 202, 208, and 212 or in an air duct. The sensor module 1000 includes a sensor module body 1002 that can be connected to a port of an air duct or build material vessel, depending on the application. The sensor module 1000 also includes a projection 1004 to which a sensor 1006 is attached. When the sensor module body 1002 is connected to an outside surface of the build material vessel, the projection 1004 extends through an aperture into the vessel. In some examples, the projection 1004 is a circuit board, and the sensor 1006 is an integrated circuit coupled to the circuit board. Signal lines (not shown) extend through the circuit board to communicatively couple the sensor 1006 to electronic components of the three-dimensional printer. The sensor can include a temperature sensor, a relative humidity sensor, or both.

The build material vessel includes a port to receive the sensor module 1000. The port will be placed at a location above the build material bed that allows the sensor 1006 to be immersed in build material. Additionally, the projection 1004 will extend into the build material vessel to a distance that places the sensor 1006 at a suitable distance from the sidewall of the build material vessel. This ensures that the sensor 1006 is able to obtain measurements that are representative of the build material contained in the vessel. The sensor module 1000 may also include a gasket 1008, such as an O-ring, to create a seal at the interface of the sensor module body and the outside surface of the build material vessel.

Figure 11:
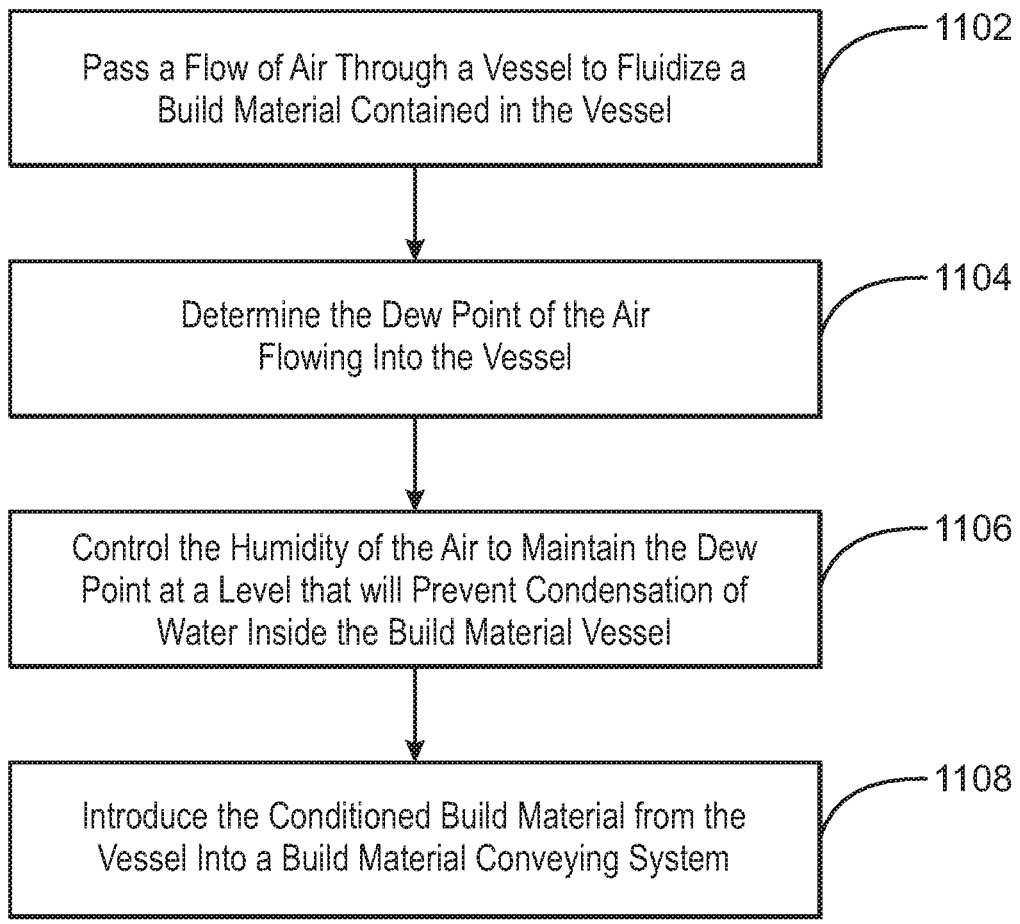
FIG. 11 is a block diagram of summarizing a method for operating a 3D printer, in accordance with examples.

FIG. 11 is a block diagram of summarizing a method 1100 for operating a 3D printer, in accordance with examples. The method 1100 may begin at block 1102. At block 1102, a flow of air of air is passed through a build material vessel to fluidize the build material contained in the vessel and maintain a controlled moisture content of the build material. The build material vessel may include a porous membrane to distribute the flow of air evenly throughout the build material contained in the vessel.

At block 1104, the dew point of the air flowing into the vessel is determined. The dew point may be computed based on temperature and/or relative humidity measurements received from sensors configured as described above in relation to FIGS. 4-10. For example, the dew point of the air flowing into the vessel can be computed based on the temperature and humidity of the air flowing into the hopper. In some examples, the dew point of the air flowing into the vessel can be computed based on the measured temperature.

At block 1106, the humidity of the air is controlled to maintain the dew point at a level that will prevent condensation of water inside the build material vessel. In some examples, the temperature of the build material inside the build material vessel is measured, and the dew point of the air flowing into the vessel is maintained at a level that is below the measured temperature of the air inside the build material vessel by a safety margin.

At block 1108, the conditioned build material is fed from the vessel into a build material conveying system. The build material may be fed into the conveying system after a suitable time period that allows the moisture content of the build material to achieve equilibrium. In some examples, the time period is predetermined based on knowledge of the system. In some examples, the time period is determined by sensing the relative humidity of the air mixed with the build material inside the build material vessel to determine whether the moisture content in the build material has reached equilibrium.

The method 1100 should not be interpreted as meaning that the blocks are necessarily performed in the order shown. Furthermore, fewer or greater actions can be included in the method 1100 depending on the design considerations of a particular implementation.

Figure 12:
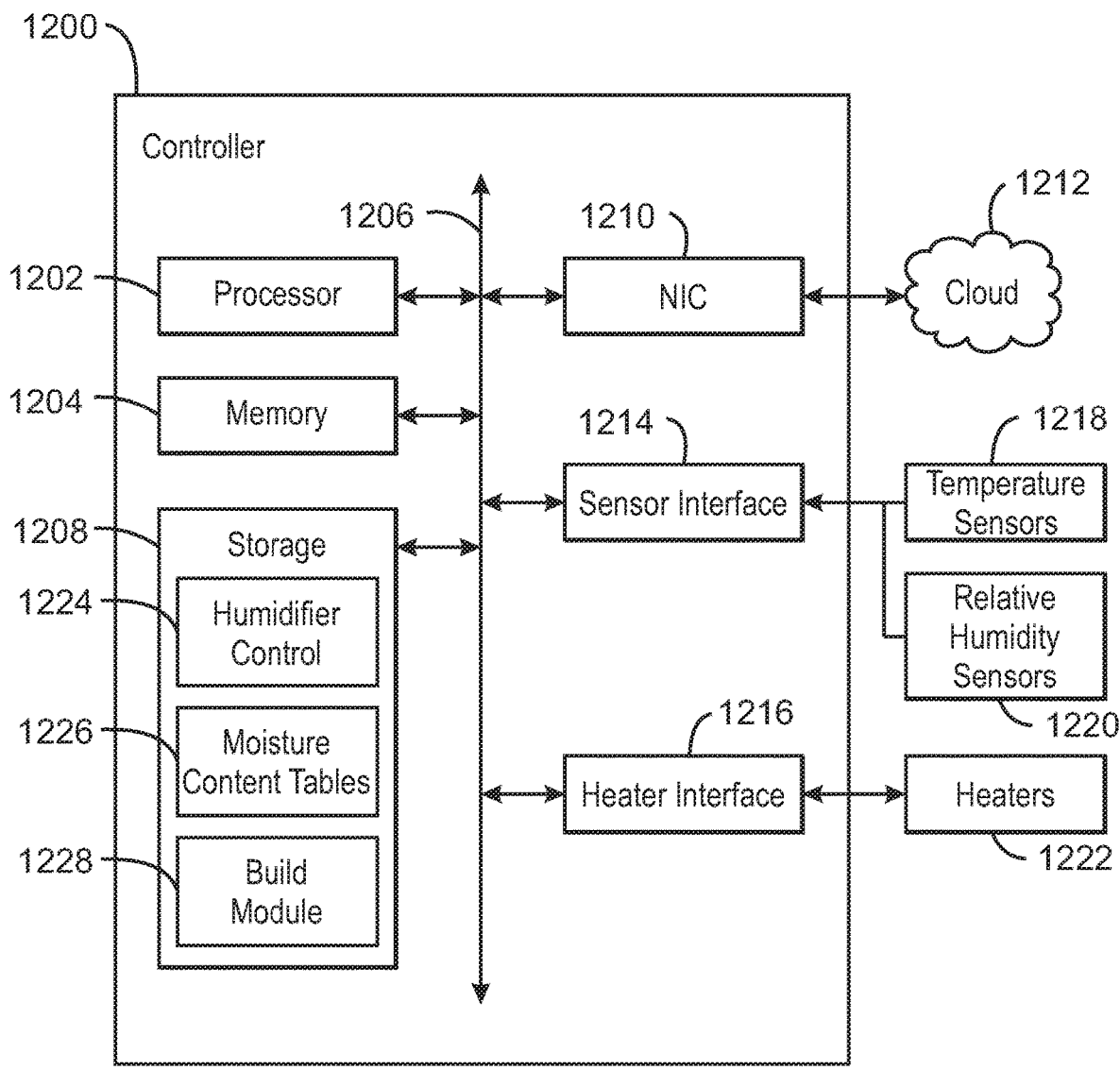
FIG. 12 is a block diagram of a controller for operating a supply station in a 3-dimensional printer, in accordance with examples.

FIG. 12 is a block diagram of a controller 1200 for operating a supply station in a three-dimensional printer, in accordance with examples. The controller 1200 may be part of the main controller for the 3D printer, or a separate controller associated with the supply stations.

The controller 1200 may include a processor 1202, which may be a microprocessor, a multi-core processor, a multi-threaded processor, an ultra-low voltage processor, an embedded processor, or other type of processor. The processor 1202 may be an integrated microcontroller in which the processor 1202 and other components are formed on a single integrated circuit board, or a single integrated circuit, such a system on a chip (SoC). As an example, the processor 1202 may include a processor from the Intel® Corporation of Santa Clara, Calif., such as a Quark™, an Atom™, an i3, an i5, an i7, or an MCU-class processor. Other processors that may be used may be obtained from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1202 may communicate with a system memory 1204 over a bus 1206. Any number of memory devices may be used to provide for a given amount of system memory. The memory may be sized between about 2 GB and about 64 GB, or greater. The system memory 1204 may be implemented using non-volatile memory devices to protect from power loss, such as static RAM (SRAM), or memory modules having backup power, for example, from batteries, super-capacitors, or hybrid systems.

Persistent storage of information such as data, applications, operating systems, and so forth, may be performed by a mass storage 1208 coupled to the processor 1202 by the bus 1206. The mass storage 1208 may be implemented using a solid-state drive (SSD). Other devices that may be used for the mass storage 1208 include flash memory cards, such as SD cards, microSD cards, xD picture cards, and the like, and USB flash drives. In some examples, the controller 1200 may have an accessible interface, such as a USB connection, an SD card socket, or a micro-SD socket to all the insertion of memory devices with build plans, instructions, and the like.

In some examples, the mass storage 1208 may be implemented using a hard disk drive (HDD) or micro HDD. Any number of other technologies may be used in examples for the mass storage 1208, such resistance change memories, phase change memories, holographic memories, or chemical memories, among others.

The components may communicate over the bus 1206. The bus 1206 may include any number of technologies, such as industry standard architecture (ISA), extended ISA (EISA), peripheral component interconnect (PCI), peripheral component interconnect extended (PCIx), PCI express (PCIe), or any number of other technologies. The bus 1208 may include proprietary bus technologies, for example, used in a SoC based system. Other bus systems may be included, such as an I2C interface, I3C interface, an SPI interface, point to point interfaces, and a power bus, among others. A network interface controller (NIC) 1210 may be included to provide communications with a cloud 1212 or network, such as a local area network (LAN), a wide area network (WAN), or the Internet.

The bus 1206 may couple the processor 1202 to interfaces 1214 and 1216 that are used to connect to other devices in the 3D printer. For example, a sensor interface 1214 may be used to couple to temperature sensors 1218 and relative humidity sensors 1220. The temperature sensors 1218 and relative humidity sensors 1220 may include any of the sensors described above in relation to FIGS. 4, 6, and 8. A heater interface 1216 may be included to control various heaters 1222 included in the 3D printer for controlling the relative humidity and temperature of the air flowing through the build material vessels 202, 208, and 212. The heaters 1222 may be any of the heaters described above in relation to FIGS. 4, 6, and 8.

The mass storage 1208 may include a humidifier control module 1224 to control the humidity of the air flowing into the build vessels, as described herein. The mass storage 1208 may also include a moisture content lookup table 1226 that correlates the moisture content of the build material with the relative humidity of the air inside the build material vessel. This lookup table 1226 can then be used to infer the build material moisture content of a well-mixed hopper from measurement of the relative humidity.

Other functions may be present, including, for example, a build module 1244. The build module 1228 may direct the build procedure for forming the 3D object. Although shown as code blocks in the mass storage 1208, it may be understood that any of the modules may be fully or partially implemented in hardwired circuits, for example, built into an application specific integrated circuit (ASIC).

While not shown, various other input/output (I/O) devices may be present within, or connected to, the controller 1200. For example, a display panel may be included to show information, such as build information, action prompts, humidity levels, temperature levels, build material moisture content, and the like. Audible alarms may be included to alert a user of a condition. An input device, such as a touch screen or keypad may be included to accept input, such as instructions on new builds, and the like.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the present techniques.

What is claimed is:

1. A system for controlling moisture content of build material in a three dimensional printer, comprising:
   an air reservoir to draw in ambient air and generate a flow of air;
   a humidifier, coupled to an output of the air reservoir, to provide water vapor to add humidity to the air generated from the air reservoir;
   a build material vessel to contain the build material and including an air inlet connected to an output of the humidifier to receive the air having the added humidity;
   a first temperature sensor located at the air inlet of the build material vessel to measure a temperature of the air flowing into the build material vessel; and
   a processor to receive the measured temperature from the first temperature sensor, determine a dew point of the air flowing into the air inlet of the build material vessel based on the measured temperature, and control the humidifier to adjust the humidity added to the air generated from the air reservoir to maintain the dew point of the air flowing into the air inlet of the build material vessel at a level that prevents condensation of water inside the build material vessel.

2. The system of claim 1, further comprising: a humidity sensor disposed at the air inlet of the build material vessel to measure the humidity of the air flowing into the build material vessel,
   wherein the dew point is computed based on the measured temperature and the measured humidity of the air flowing into the build material vessel by the first temperature sensor and the humidity sensor.

3. The system of claim 1, wherein the humidifier includes a water bath and a heater that heats the water bath to provide the water vapor.

4. The system of claim 1, further comprising: a second temperature sensor located inside the build material vessel to measure a temperature of the build material inside the build material vessel,
   wherein to maintain the dew point at the level that prevents condensation of water inside the build material vessel, the dew point is maintained at a level that is below the measured temperature of the build material inside the build material vessel by a safety margin.

5. The system of claim 1, further comprising: a humidity sensor located inside the build material vessel to measure a relative humidity of the air mixed with the build material inside the build material vessel,
   wherein the relative humidity is monitored to determine whether a moisture content in the build material has reached an equilibrium.

6. The system of claim 1, wherein the build material vessel is a hopper to deliver the build material to a build material feed system of the three dimensional printer.

7. The system of claim 1, wherein the air flowing into the build material vessel fluidizes the build material.

8. The system of claim 6, wherein the build material vessel comprises a porous membrane to distribute the flow of air evenly throughout the build material contained in the build material vessel.

9. The system of claim 1, wherein the humidity added to the air generated from the air reservoir is controlled to increase a moisture content of the build material in the build material vessel.

* * * * *